United States Patent
Byon et al.

(10) Patent No.: US 8,165,462 B2
(45) Date of Patent: Apr. 24, 2012

(54) SHAKE CORRECTION MODULE FOR PHOTOGRAPHING APPARATUS AND PHOTOGRAPHING APPARATUS INCLUDING THE SAME

(75) Inventors: Kwang-seok Byon, Changwon (KR); Jung-su Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 12/378,229

(22) Filed: Feb. 12, 2009

(65) Prior Publication Data
US 2009/0202233 A1 Aug. 13, 2009

(30) Foreign Application Priority Data
Feb. 12, 2008 (KR) .................. 10-2008-0012605

(51) Int. Cl.
*G03B 17/00* (2006.01)
(52) U.S. Cl. ..................... 396/55; 348/208.99
(58) Field of Classification Search .............. 396/52–55, 396/429; 348/208.2, 208.4, 208.7, 208.99, 348/208.1, 208.5
See application file for complete search history.

(56) References Cited

U.S. PATENT DOCUMENTS

| | | | |
|---|---|---|---|
| 5,095,198 A * | 3/1992 | Nakazawa et al. ......... 250/201.8 |
| 5,835,799 A | 11/1998 | Washisu |
| 5,943,512 A * | 8/1999 | Hamada et al. ................ 396/55 |
| 6,064,827 A * | 5/2000 | Toyoda .......................... 396/55 |
| 6,631,042 B2 | 10/2003 | Noguchi |
| 6,734,914 B1 * | 5/2004 | Nishimura et al. ........... 348/375 |
| 6,768,587 B2 * | 7/2004 | Hirunuma et al. ............ 359/554 |
| 2005/0232617 A1 * | 10/2005 | Uenaka et al. ................ 396/55 |
| 2005/0276588 A1 * | 12/2005 | Tsutsumi ...................... 396/55 |
| 2007/0002147 A1 * | 1/2007 | Nomura et al. ......... 348/208.11 |
| 2007/0019076 A1 * | 1/2007 | Teramoto et al. ........ 348/207.99 |
| 2007/0092236 A1 * | 4/2007 | Onda ............................. 396/55 |
| 2007/0292119 A1 * | 12/2007 | Lee ................................ 396/55 |
| 2009/0039734 A1 * | 2/2009 | Takahashi et al. ....... 310/323.02 |
| 2009/0059372 A1 * | 3/2009 | Kawauchi et al. ............ 359/554 |
| 2009/0060485 A1 * | 3/2009 | Takahashi ..................... 396/55 |

* cited by examiner

*Primary Examiner* — Clayton E LaBalle
*Assistant Examiner* — Warren K Fenwick
(74) *Attorney, Agent, or Firm* — Drinker Biddle & Reath LLP

(57) ABSTRACT

A shake correction module for a photographing apparatus, and a photographing apparatus including the same are provided. The module includes a base plate; a slider member disposed on the base plate so as to be able to move on the base plate, and accommodating an imaging element; a drive member generating a driving force so as to move the slider member; and a friction-reducing element disposed between the base plate and the slider member so as to reduce friction between the slider member and the base plate.

20 Claims, 3 Drawing Sheets

SHAKE CORRECTION MODULE FOR PHOTOGRAPHING APPARATUS AND PHOTOGRAPHING APPARATUS INCLUDING THE SAME

CROSS-REFERENCE TO RELATED PATENT APPLICATION

This application claims the benefit of Korean Patent Application No. 10-2008-0012605, filed on Feb. 12, 2008, in the Korean Intellectual Property Office, the disclosure of which is incorporated herein in its entirety by reference.

BACKGROUND OF THE INVENTION

1. Field of the Invention

The present invention relates generally to a photographing apparatus. More particularly, the present invention relates to a shake correction module for a photographing apparatus, so as to reduce the effect of shaking during photographing, and a photographing apparatus including the shake correction module.

2. Description of the Related Art

Along with the widespread use of photographing apparatuses such as digital still cameras and digital video cameras, the desire of users to obtain higher quality photos and motion pictures is increasing.

Shake correction modules are increasingly being adopted in photographing apparatuses to prevent degradation in the resolution of photos due to a shaking of the photographing apparatuses by the user. A conventional shake correction module uses a method of performing a shake correction function by moving a shake correction lens or imaging pickup device. Although various shake correction modules are known in the art, a shake correction module with reduced friction between moving parts would be an important improvement in the art.

SUMMARY OF THE INVENTION

According to an aspect of the present invention a shake correction module for a photographing apparatus is provided. An embodiment of the shake correction module comprises: a base plate; a slider member disposed on the base plate so as to be able to move on the base plate, and accommodating an imaging element; a drive member generating a driving force so as to move the slider member; and a friction-reducing element disposed between the base plate and the slider member so as to reduce friction between the slider member and the base plate.

The friction-reducing element may comprise: a first member configured symmetrically with respect to a centroid of the slider member; and a second member configured symmetrically with respect to the centroid of the slider member, the second member crossing the first member.

The first member may comprise a first bar and a second bar which are parallel to each other and spaced apart from the centroid of the slider member.

The slider member may comprise a support portion formed on a surface of the slider member that faces the base plate. The support portion is configured to support the first member so that the first member is rotatable about an axis in a direction parallel to the surface of the base plate.

The support portion comprises: an extending portion extending from the surface of the slider member that faces the base plate towards the base plate; and a hollow portion formed through the extending portion so that the first member is disposed through the hollow portion.

The first and second bars may each be shaped like cylinders.

The second member may comprise a third bar and a fourth bar which are disposed to be symmetric with the centroid of the slider member.

The base plate may comprise an insert portion formed in a surface of the base plate that faces the base plate, so that the second member is inserted into the insert portion in a direction parallel to a longitudinal direction of the second member.

The third bar and the fourth bar may each be shaped like cylinders.

The drive member may be a voice coil motor (VCM).

The slider member may comprise an accommodation portion for accommodating the imaging element.

The imaging element may be a lens or an imaging pickup device.

According to another aspect of the present invention, there is provided a photographing apparatus comprising the above module.

DETAILED DESCRIPTION OF THE EMBODIMENTS

Figure 1:
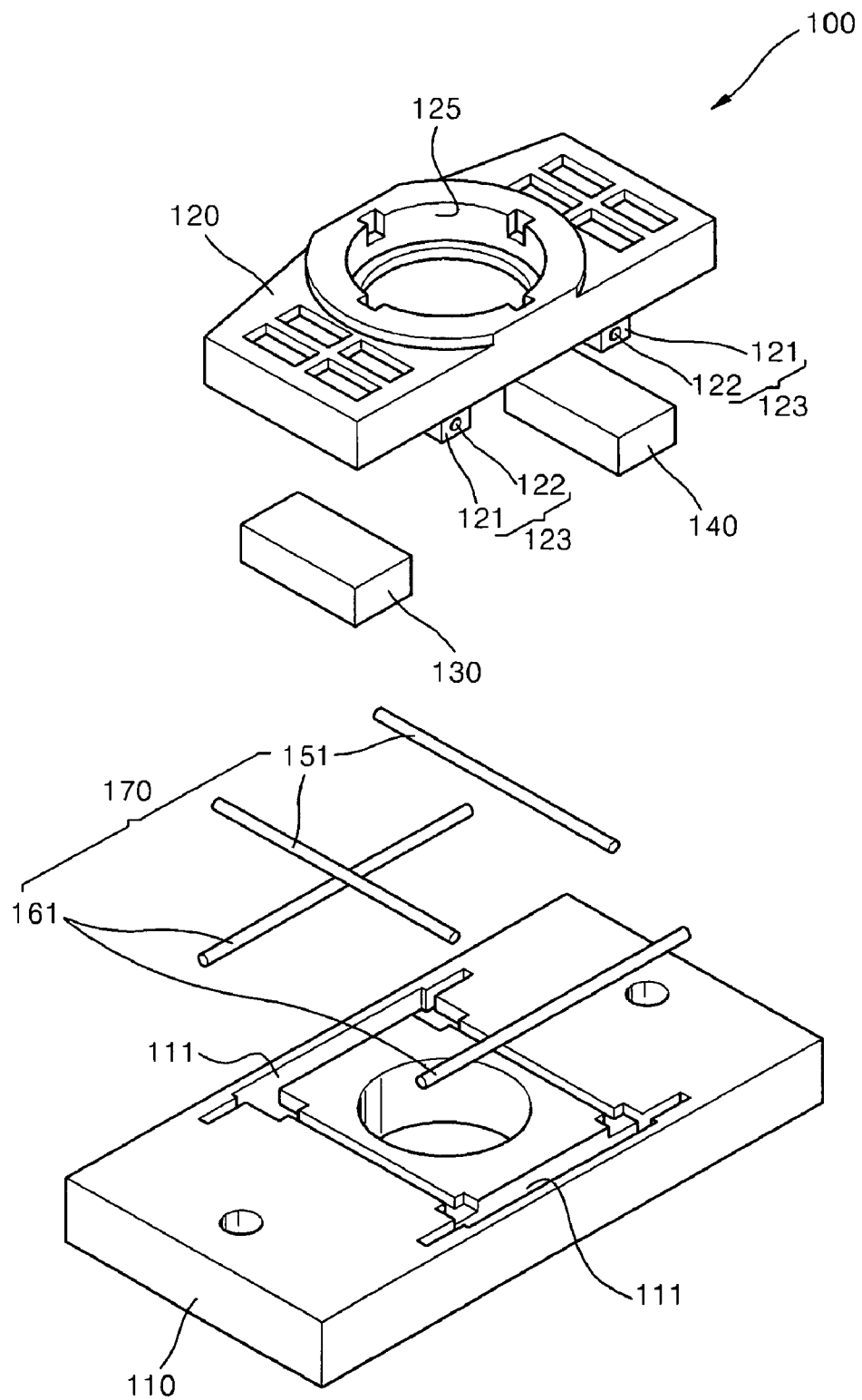
FIG. 1 is an exploded perspective view of an example shake correction module for a photographing apparatus, according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. In the drawings, the thicknesses of layers and regions are exaggerated for clarity. The same reference numerals in the drawings denote the same element.

Figure 2:
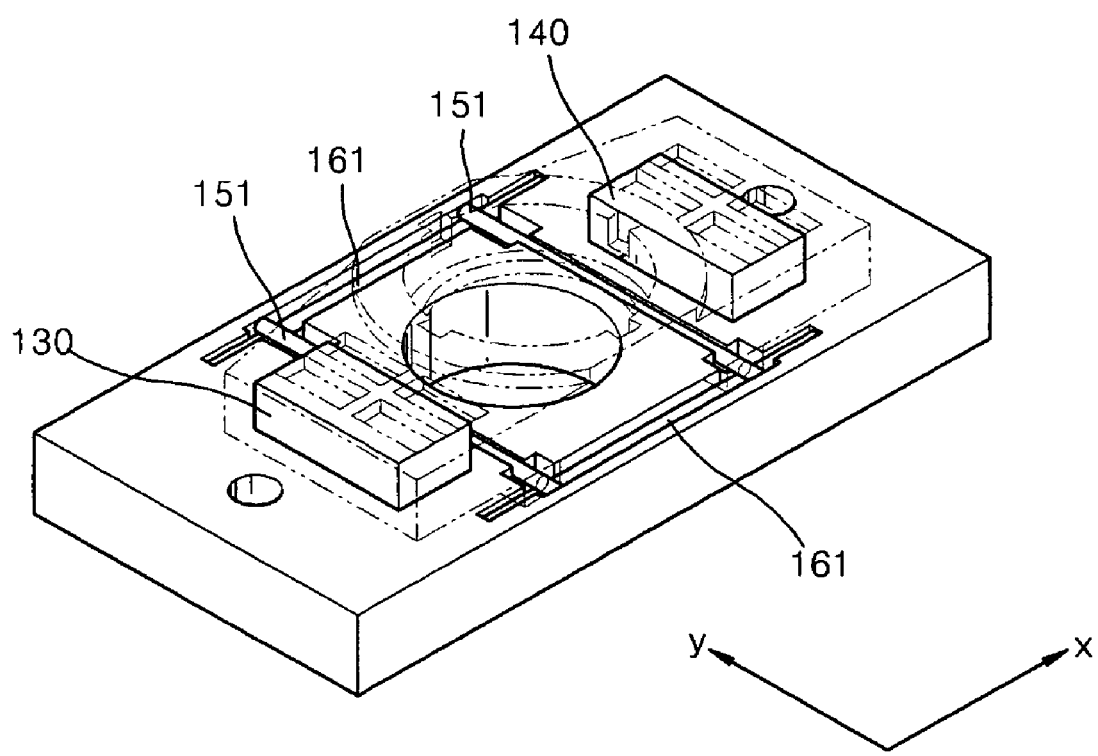
FIG. 2 is a perspective view of the shake correction module of FIG. 1 with the slider member being shown in phantom lines to illustrate the configuration of the friction-reducing element.
Figure 3:
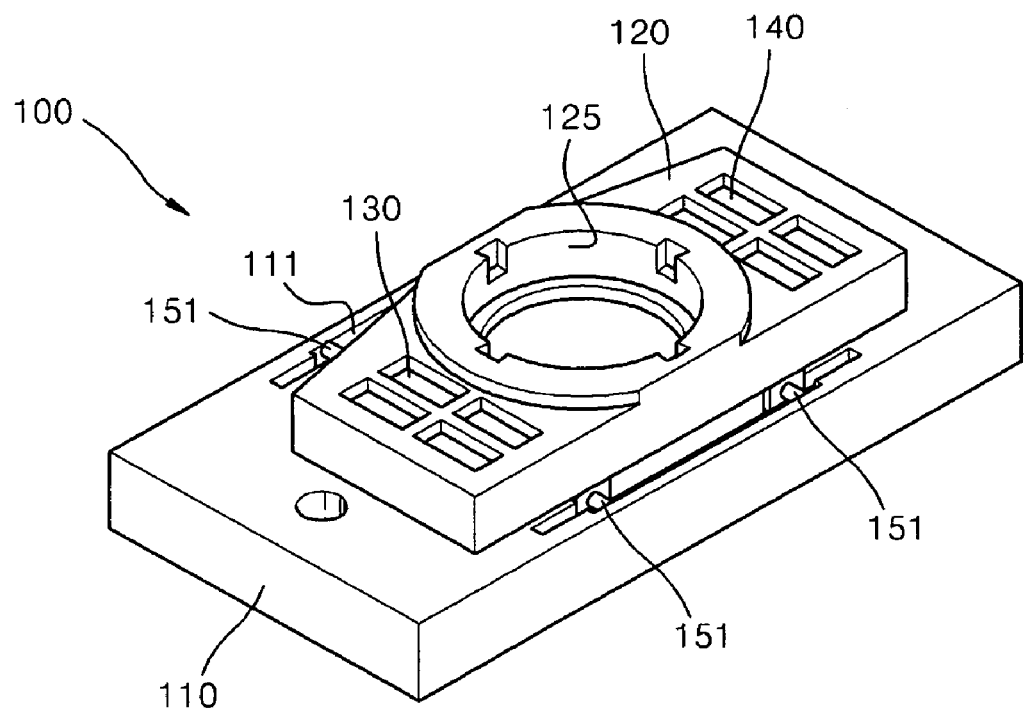
FIG. 3 is a perspective view of the shake correction module of FIG. 1.
Figure 3:

Referring to FIGS. 1 through 3, the shake correction module 100 includes a base plate 110, a slider member 120, a first drive member 130, a second drive member 140 and a friction-reducing element 170.

The base plate 110 is arranged at the lowermost side of the shake correction module 100 as shown in the Figures. However, the module 100 may be oriented otherwise such that, for example, the base plate 110 is arranged at the module's uppermost side. The base plate 110 may be formed of metal or synthetic resin that has a relatively high rigidity. To this end, the base plate 110 functions as the main frame of the shake correction module 100, and the base plate 110 may be connected, coupled or attached to a main body (e.g., housing or internal frame) of a photographing apparatus. The base plate 110 has a plate shape.

The base plate 110 may include insert portions 111 for accommodating a second member 161 of the friction-reducing element 170. As shown, the base plate 110 is configured with two insert portion 111 to correspond with the two bars of the second member 161. However fewer or additional insert portions 111 may be provided. The insert portions 111 are formed in a surface of the base plate 110 that faces the slider member 120. The insert portions 111 may be generally linear grooves formed in one surface of the base plate 110 so that the second members 161 (e.g., two as shown), which are shaped like cylinders, are inserted into the insert portions 111 to extend along an x direction (see FIGS. 2 and 3) that is parallel to the second members 161. The second members 161 are inserted into the insert portions 111 so as to be rotatable around their respective longitudinal axes, as will be described. As further shown, the second members 161 are configured to be parallel and spaced apart from each other on opposite sides of a central aperture of the base plate 110. A centroid of the base plate 110 is defined by a center of the central aperture.

As illustrated in FIG. 1, since the second member 161 includes two bars, the two insert portions 111 are formed in the surface of the base plate 110 so that the two bars constituting the second member 161 are correspondingly inserted into the two insert portions 111. However, the present invention is not limited thereto. That is, when the second member 161 includes at least three bars, a corresponding number of insert portions may be formed.

The two bars of the second member 161 are disposed parallel to each other, and are arranged to be symmetric with a centroid of the slider member 120. Thus, the insert portions 111 are also arranged parallel to each other, and are arranged to be symmetric with the centroid of the slider member 120.

The slider member 120 is disposed on the base plate 110, and can be moved by the first drive member 130 and the second drive member 140 in the x-axis direction or the y-axis direction. The slider member 120 includes an accommodation portion 125 for accommodating an imaging element (not shown). The accommodation portion 125 may be formed in the center of the slider member 120. The imaging element may be a lens (not shown) or an image pickup device (not shown).

As further shown in FIG. 1, the slider member 120 may include support portions 123 formed on a surface of the slider member 120 that faces the base plate 110. Support portions 123 are configured to support a first member 151 of the friction-reducing element 170 as can be appreciated from FIGS. 2 and 3. As shown in FIG. 1, the slider member 120 is configured with two support portions 123 which correspond to the two bars of the first member 151. However the slider member 120 may be configured with fewer or additional support portions 123 relative to the configuration of the first member 151.

The support portions 123 may each include an extending portion 121 and a hollow portion 122. The extending portion 121 may extend from the surface of the slider member 120 that faces the base plate 110, towards the base plate 110. The hollow portion 122 is a hole formed in the extending portion 121, and a central axis of the hollow portion 122 may be formed parallel to the surface of the slider member 120 from which the extending portion 121 projects. Since the first member 151 is disposed through the hollow portion 122, the first member 151 can be disposed parallel to the underside surface of the slider member 120. The first member 151 is rotatable around its longitudinal direction in the hollow portion 122, as will be described later.

The support portions 123 may be formed on the surface of the slider member 120 so that two bars of the first member 151 are arranged to be symmetric with the centroid of the slider member 120. That is, the two bars of the first member 151 are parallel and spaced apart from each other in the x-axis direction such that the bars are configured on opposite sides of the accommodation portion 125.

Since the two bars of the first member 151 are arranged to be symmetric with the centroid of the slider member 120, the support portions 123 are also symmetric with the centroid of the slider member 120.

The first and second drive members 130 and 140 are disposed between the base plate 110 and the slider member 120. The drive members 130, 140 are configured to generate a driving force for moving the slider member 120 relative to the base plate 110. The first and second drive members 130 and 140 may each be a voice coil motor (VCM). The VCM is composed of a magnetic material and a coil, and generates a driving force due to a Lorentz force between the magnetic material and the coil through which a current flows. One of the first and second drive members 130 and 140 can move the slider member 120 in the x-axis direction, and the other one of the first and second drive members 130 and 140 can move the slider member 120 in the y-axis direction. In addition, the first and second drive members 130 and 140 can generate the driving force with respect to the x-axis direction and the driving force with respect to the y-axis direction, respectively.

The friction-reducing element 170 is disposed between the slider member 120 and the base plate 110, and can reduce friction between the slider member 120 and the base plate 110. The friction-reducing element 170 may include the first member 151 and the second member 161.

As described above, the first member 151 is supported by the support portion 123, which is formed on the surface of the slider member 120. Referring to FIG. 1, the first member 151 may include the two bars that are arranged parallel to each other so as to be symmetric with the centroid of the slider member 120. The two bars of the first member 151 may each be shaped like a cylinder. Although two bars are shown, the first member 151 may include a plurality of bars. The two bars may be disposed parallel to each other, and may each be supported by the support portions 123 so as to be symmetric with the centroid of the slider member 120.

As described above, the second member 161 may be inserted into the insert portions 111 formed in the surface of the base plate 110. Referring to FIG. 1, the second member 161 may include the two bars that are arranged parallel to each other so as to be symmetric with the centroid of the slider member 120.

In addition, the second member 161 may be disposed so as to cross the first member 151. In particular, the two bars of the second member 161 are inserted into the insert portions 111 so as to be disposed to be parallel to each other. The two bars constituting the first member 151 may be arranged so as to be parallel to each other and cross the two bars constituting the second member 161. The two bars constituting the second member 161 and the two bars constituting the first member 151 may be arranged in a square shape, as illustrated in FIG. 2.

The two bars constituting the second member 161 may each be shaped like a cylinder. Thus, the two bars constituting the first member 151 are in contact with the two bars constituting the second member 161 in the form of a point-contact at intersections between the first member 151 and the second member 161. When each of the first member 151 and the second member 161 includes two bars, the first member 151 and the second member 161 can cross each other at four intersections. As shown in FIG. 3, ends of the bars of the first member 151 extend from the support portions 123 to contact the second member 161 thereunder. To this end, the slider member 120 may move in the x-axis direction by sliding the first member 151 over at least a portion of the length of the second member 161.

The first member 151 is disposed on the second member 161 so as to cross the second member 161. Since the first member 151 and the second member 161 are shaped like cylinders, when a driving force acts on the slider member 120 in the x-axis direction, the slider member 120 is moved along the second member 161 while the first member 151 is rotatable around its longitudinal axis. In addition, when a driving force acts on the slider member 120 in the y-axis direction, the slider member 120 is moved in the y-axis direction while the second member 161 is rotatable in the insert portions 111.

According to the above embodiment, since the first member 151, including at least two bars, is in contact with the second member 161 including at least two bars in the form of point-contacts at four intersections or more, the slider member 120 can be prevented from being inclined to one side. In addition, since the first member 151 is in contact with the second member 161 in the form of point-contacts, friction can be reduced when the slider member 120 is moved, as compared with the case of a conventional shaft method.

Hereinafter, the operations of the shake correction module 100 illustrated in FIG. 1 will be described with reference to FIG. 1.

When a shake occurs during photographing, the shake is detected by a shake detection unit (not shown), which is provided in the photographing apparatus.

A gyro sensor or an acceleration sensor can be used as the shake detection unit. Then, data relating to the amount and direction of the shake measured by the shake detection unit is transferred to a control circuit board (not shown). The shake detection unit may be arranged out of the control circuit board or directly arranged on the control circuit board.

The control circuit board calculates the necessary amount of movement of the slider member 120 where an imaging device (not shown) is accommodated to correct for the detected shake. The calculated amount the movement is measured in terms of the movements in the x-axis and y-axis directions.

Next, the control circuit board drives the first and second drive members 130 and 140 based on the calculated amount of movement in the x-axis and y-axis directions so that the slider member 120 is moved on the base plate 110 according to the calculated amount of movement.

For example, the control circuit board drives the first drive member 130 in order to move the slider member 120 in the x-axis direction such that the slider member 120 is linearly moved along a first axis (i.e., the x-axis).

In addition, the control circuit board drives the second drive member 140 in order to move the slider member 120 in the y-axis direction such that the slider member 120 is linearly moved along a second axis (i.e., the y-axis).

The movements of the slider member 120 in the x-axis and y-axis directions are measured using a movement measuring magnet (not shown) and a hall sensor (not shown). The measured data is transferred to the control circuit board to be used as a feedback signal to control the first and second drive members 130 and 140. As described above, when the slider member 120 is appropriately moved in a direction to correct for the shake, the imaging device accommodated in the slider member 120 is moved so that the shake correction is performed during photographing.

According to the above embodiments, a shake correction module for a photographing apparatus can be used in an imaging device. The imaging device may be a device having various configurations and forms, such as a digital compact camera, a single-lens reflex camera, an image camcorder or a film-type camera.

According to the above embodiments, friction can be reduced in a shake correction module for a photographing apparatus.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A shake correction module for a photographing apparatus, the shake correction module comprising:
    a base plate;
    a slider member disposed on the base plate for accommodating an imaging element, the slider member being movable on the base plate;
    a drive member generating a driving force for moving the slider member; and
    a friction-reducing element disposed between the base plate and the slider member for reducing friction between the slider member and the base plate, the friction-reducing element comprising:
        a first member symmetric with respect to a centroid of the slider member; and
        a second member symmetric with respect to the centroid of the slider member, the second member crossing the first member and contacting the first member at a point where the second member crosses the first member.

2. The module of claim 1, wherein the first member comprises a first bar and a second bar, the first and second bars being parallel and spaced-apart equidistantly from the centroid of the slider member.

3. The module of claim 2, wherein the slider member comprises a support portion formed on a surface of the slider member that faces the base plate, the support portion configuring the first and second bars for rotation about axes extending through lengths of the first and second bars for moving the slider member in a plane that is parallel to a surface of the base plate.

4. The module of claim 3, wherein the support portion comprises:
    an extending portion projecting towards the base plate from the surface of the slider member that faces the base plate; and
    a hollow portion formed through the extending portion, the first member being rotatably disposed in the hollow portion.

5. The module of claim 2, wherein the first bar and the second bar are each shaped like cylinders.

6. The module of claim 2, wherein the second member comprises a third bar and a fourth bar, the third and fourth bars being parallel and spaced-apart equidistantly from the centroid of the slider member.

7. The module of claim 6, wherein the base plate comprises an insert portion formed in a surface of the base plate that faces the slider member, the insert portion being configured to accept the third and fourth bars, the insert portion extending along a direction that is parallel to a longitudinal direction of the second member.

8. The module of claim 6, wherein the third bar and the fourth bar are each shaped like cylinders.

9. The module of claim 7, wherein the insert portion is formed as a generally linear groove in the surface of the base plate that faces the slider member.

10. The module of claim 1, wherein the drive member is a voice coil motor.

11. The module of claim 1, wherein the slider member comprises an accommodation portion for accommodating the imaging element.

12. The module of claim 1, wherein the imaging element is a lens or an imaging pickup device.

13. The module of claim 1, wherein the second member and the first member are each symmetric with respect to the centroid of the slider member along a different axis from one another.

14. A photographing apparatus comprising:
a base plate;
an imaging element;
a slider member connected with the imaging element for moving the imaging element relative to the base plate, the slider member having a centroid;
a drive member generating a shake-counteracting driving force for moving the slider member in a first axis direction and a second axis direction that crosses the first axis direction; and
a friction-reducing element between the base plate and the slider member, the friction-reducing element reducing friction between the slider member and the base plate in the first and second axis directions, the friction-reducing element comprising:
first and second parallel bars spaced apart along the first axis direction, the first and second parallel bars being equidistantly spaced from the centroid of the slider member; and
third and fourth parallel bars spaced apart along the second axis direction, the third and fourth parallel bars being equidistantly spaced from the centroid of the slider member,
wherein the first through fourth parallel bars define a parallelogram, and the first and second parallel bars cross the third and fourth parallel bars and contact the third and fourth parallel bars at a point where the first and second parallel bars cross the third and fourth parallel bars.

15. The apparatus of claim 14, wherein the slider member comprises a support portion formed on a surface of the slider member that faces the base plate, the support portion configuring the first and second bars for rotation about axes extending through lengths of the first and second bars for moving the slider member along the second axis direction in a plane that is parallel to a surface of the base plate.

16. The apparatus of claim 15, wherein the support portion comprises:
extending portions projecting towards the base plate from the surface of the slider member that faces the base plate; and
hollow portions formed through the extending portion, the first and second bars being rotatably disposed in the hollow portions.

17. The apparatus of claim 14, wherein the first through fourth bars are each shaped like cylinders.

18. The apparatus of claim 17, wherein the base plate comprises insert portions formed in a surface of the base plate that faces the slider member, the insert portions being configured to accept the third and fourth bars.

19. The apparatus of claim 14, wherein the drive member is a voice coil motor.

20. The apparatus of claim 14, wherein the imaging element is a lens or an imaging pickup device.

* * * * *